(12) United States Patent
Sørensen (10) Patent No.: US 9,306,460 B2
(45) Date of Patent: Apr. 5, 2016

(54) POWER SUPPLY COMPRISING A STANDBY FEATURE

(75) Inventor: Alex Sørensen, Esbjerg V (DK)

(73) Assignee: VKR HOLDING A/S (DK)

( * ) Notice: Subject to any disclaimer, the term of this patent is extended or adjusted under 35 U.S.C. 154(b) by 173 days.

(21) Appl. No.: 14/001,188

(22) PCT Filed: Feb. 20, 2012

(86) PCT No.: PCT/DK2012/000015
§ 371 (c)(1),
(2), (4) Date: Aug. 23, 2013

(87) PCT Pub. No.: WO2012/113396
PCT Pub. Date: Aug. 30, 2012

(65) Prior Publication Data
US 2014/0003094 A1    Jan. 2, 2014

Related U.S. Application Data

(60) Provisional application No. 61/445,816, filed on Feb. 23, 2011.

(30) Foreign Application Priority Data

Feb. 23, 2011   (DK) .................... 2011 00122

(51) Int. Cl.
*H02M 3/335*   (2006.01)
*H02M 3/337*   (2006.01)
(Continued)

(52) U.S. Cl.
CPC .......... *H02M 3/33507* (2013.01); *H02M 3/156* (2013.01); *H02M 3/337* (2013.01);
(Continued)

(58) Field of Classification Search
CPC ............ H02M 2001/0022; H02M 2001/0032; H02M 2001/0058
See application file for complete search history.

(56) References Cited

U.S. PATENT DOCUMENTS 5,995,384 A * 11/1999 Majid et al. ................ 363/21.18
6,018,467 A *  1/2000 Majid et al. ..................... 363/16
(Continued)

FOREIGN PATENT DOCUMENTS

CN    101976959 A    2/2011
WO    2004030194 A1  4/2004

OTHER PUBLICATIONS

International Search Report for corresponding application PCT/DK2012/000015 filed Feb. 20, 2012: Mail Aug. 29, 2012.
(Continued)

*Primary Examiner* — Timothy J Dole
*Assistant Examiner* — Yusef Ahmed
(74) *Attorney, Agent, or Firm* — Cantor Colburn LLP (57) ABSTRACT

A power supply device including a switch arrangement including switches for generating a square wave output, a switch control arrangement for controlling the switch arrangement, a resonator tank, a rectifier circuitry for rectifying in an output from the tank, and a burst mode operation arrangement configured to facilitate a standby mode of the power supply and including a burst mode restriction arrangement for receiving and evaluating a first feedback parameter associated with a switch of the switch arrangement, the burst mode operation arrangement further receiving and evaluating a second feedback parameter indicative of the output voltage of the power supply device, and being configured to disable and enable the burst mode feature based on the evaluation of both the first feedback parameter and second feedback parameter by controlling an output from the burst mode operation arrangement.

20 Claims, 5 Drawing Sheets

(51) Int. Cl.
*H02M 3/156* (2006.01)
*H02M 1/00* (2007.01)

(52) U.S. Cl.
CPC .. *H02M3/33523* (2013.01); *H02M 2001/0035* (2013.01); *H02M 2001/0058* (2013.01); *Y02B 70/1491* (2013.01); *Y02B 70/16* (2013.01)

(56) References Cited

U.S. PATENT DOCUMENTS

| | | | | |
|---|---|---|---|---|
| 6,118,675 | A | * | 9/2000 | Lionetto et al. ............ 363/21.13 |
| 7,304,464 | B2 | * | 12/2007 | Weng et al. ................... 323/285 |
| 7,529,105 | B1 | * | 5/2009 | Choi et al. ................. 363/21.12 |
| 2003/0042879 | A1 | * | 3/2003 | Huh et al. ...................... 323/282 |
| 2006/0017403 | A1 | * | 1/2006 | Matsushima ................ 315/291 |
| 2007/0007936 | A1 | * | 1/2007 | Hiasa ........................... 323/282 |
| 2008/0002441 | A1 | * | 1/2008 | Allinder ..................... 363/21.14 |
| 2008/0030178 | A1 | * | 2/2008 | Leonard et al. ............... 323/282 |
| 2009/0244934 | A1 | * | 10/2009 | Wang et al. ................ 363/21.06 |
| 2009/0251926 | A1 | * | 10/2009 | Choi et al. ....................... 363/16 |
| 2010/0020573 | A1 | * | 1/2010 | Melanson ....................... 363/41 |
| 2010/0039836 | A1 | * | 2/2010 | Gong et al. ................ 363/21.13 |
| 2010/0238689 | A1 | * | 9/2010 | Fei et al. ..................... 363/21.16 |
| 2011/0019445 | A1 | * | 1/2011 | Wu et al. .......................... 363/78 |
| 2011/0043122 | A1 | * | 2/2011 | Alexandrov .................. 315/246 |
| 2011/0095730 | A1 | * | 4/2011 | Strijker et al. ................ 323/205 |
| 2011/0279043 | A1 | * | 11/2011 | Hagino et al. ............ 315/185 R |
| 2012/0113689 | A1 | * | 5/2012 | Chen et al. ................. 363/21.17 |
| 2012/0201055 | A1 | * | 8/2012 | Moon et al. ................ 363/21.02 |
| 2012/0250360 | A1 | * | 10/2012 | Orr et al. .................... 363/21.02 |
| 2012/0250378 | A1 | * | 10/2012 | Kok et al. ......................... 363/78 |
| 2013/0082742 | A1 | * | 4/2013 | Ren et al. ........................ 327/81 |
| 2013/0128623 | A1 | * | 5/2013 | Hosotani .................... 363/21.01 |
| 2014/0016362 | A1 | * | 1/2014 | Adragna et al. ........... 363/21.02 |

OTHER PUBLICATIONS

Infineon Technologies Application Note ICExxx/ICE3Bxxx CoolSET F3 Design Guide, v1.1, Oct. 2009.
ON Semiconductor Applcation Note NCP1203, Rev 10., Publication Order No. NCP1203/D, Dec. 2010.
Bin Wang, "Analysis and Implementation of LLC Burst Mode for Light Load Efficiency Improvement", 2009, IEEE, p. 58-64.

* cited by examiner

POWER SUPPLY COMPRISING A STANDBY FEATURE

The invention relates to a power supply device and a method of controlling a standby feature of a power supply device.

The number of various electric devices has increased in the recent years, and continues to increase. However, a considerably amount of these electric devices are not in operation for a substantial amount of the time, and thus the devices are operated in a standby mode when they are not in operation.

The standby mode saves electric power when the device is not in operation, and at the same time, it preferably enables that e.g. features facilitating automatic and/or remote turning on the device from stand-by mode, and/or that power supply to some preselected electric arrangements of the device is facilitated.

Thus, power supplies such as Switch Mode Power Supplies (SMPS) for supplying such electric devices with power at the appropriate voltage level are known to comprise a stand-by feature to facilitate operating the power supply in a standby mode.

Such standby modes of SMPS are known to comprise a burst mode facility which is disabled during normal operation of the power supply, but when the SMPS power supply is operated in standby, the SMPS operates in the burst mode during which the SMPS is arranged to alternately become activated and deactivated to save power based on certain parameters.

US 2009/0251926 discloses a power supply comprising a burst mode feature used in standby mode, where the burst mode feature is controlled based on certain parameters. The standby feature in this document gives several disadvantages in relation to e.g. controlling the power supply in standby.

US 2010/0039836 relates to a power converter with a resistor divider with an internal node to sense an input line voltage. A controller compares a feedback voltage dependent on a power converter output characteristic to a current-sense signal with an offset dependent on a voltage of the internal node to control entry and exit of the power converter from a burst mode operation.

WO 2004/030194 relates to a switching mode power supply. An input received from the secondary side of the transformer of the power supply and indicative of the power being drawn by the loads is used to control the timing of bursts. The input is compared with threshold values, and switching is enabled if the input rises above a first higher threshold value, and disabled if it falls below a second lower threshold value.

Also the documents US2008/0030178, U.S. Pat. Nos. 7,304,464 and 6,018,467 disclose different ways of operating switching mode power supplies.

SUMMARY

The present document relates to a first configuration of a power supply device comprising:
- a switch arrangement comprising switches for generating a square wave output,
- a switch control arrangement for controlling said switch arrangement,
- a resonator tank,
- a rectifier circuitry for rectifying an output from said tank,
wherein said switch arrangement is arranged to operate according to an output from said switch control arrangement, wherein said resonator tank is arranged to receive said square wave output, wherein said rectifier circuitry is arranged to provide an output to a potential load, and wherein said power supply device further comprises a burst mode operation arrangement configured to facilitate a standby mode of said power supply,
said burst mode operation arrangement comprising a burst mode restriction arrangement configured for receiving and evaluating a first feedback parameter associated with a switch of said switch arrangement and being indicative of the power consumption at said output to said potential load, the burst mode restriction arrangement being configured to disable and enable said burst mode feature based on said evaluation by controlling an output from said burst mode operation arrangement.

By evaluating the first feedback parameter as described above, it is e.g. possible to avoid utilization of an advanced and cost expensive additional device for monitoring the switching frequency of the switches of the switch arrangement to control the burst mode.

In general it is understood that the term "normal operation" or "normal mode" is understood that the power supply is supplying the load with power when the load is active, i.e. not in standby.

Furthermore, standby mode is a mode in which no load or a light load is connected to the output terminals of the power supply device.

In an advantageous aspect, said evaluation comprises continuously evaluating said first feedback parameter.

By continuously evaluating the first feedback parameter a more precise and dynamic control of the standby mode may be achieved. Also, a more precise evaluation may be achieved by the continuous evaluation. The continuous evaluation is preferably performed by means of analog electric circuitry, but in other embodiments, the continuous evaluation may be performed by sampling the feedback parameter with a predefined sample frequency and process the samples.

Preferably, said evaluation comprises said first feedback parameter being averaged over a time period.

Averaging the feedback over time may give several advantages. One advantage obtained by the averaging may be that the system is less sensitive to unintended load variations such as e.g. load spikes at the output terminals.

Another advantage obtained by the averaging may be that the precession of the burst mode operation arrangement is not dependent on detecting and acting rapidly upon events occurred to specific times, e.g. resulting in a less complicated control of the standby mode.

A further advantage of the averaging may be that the burst mode restriction arrangement due to the averaging does not unintentionally enter standby mode to operate the power supply device in burst mode in that the averaging facilitates a time delay between an event detected at the first feedback parameter and an entering into burst mode.

The time period may be regarded as a "window" which is shifted over time.

Advantageously, said evaluation may comprise utilizing a moving average approach for continuously determining the average of said first feedback parameter (FB1) within a predefined time period.

A moving averaging approach may be especially advantageous in relation to implementing the averaging of the first feedback parameter. However, it is understood that any other appropriate type of averaging may be utilized.

In a preferred aspect, said evaluation comprises comparing the result of said averaging with a first threshold and disabling said burst mode feature if said result cross said first threshold.

The first threshold is preferably selected based on the application in which the power supply is intended to be used.

In some situation where the load connected to output terminals of the power supply device either consumes power in normal mode and does substantially not consume power in standby, the threshold may be set lower than in situations where the load consumes power during standby, so as to prevent the power supply device from starting up unintentionally.

It is understood that the first threshold in aspects may comprise a falling threshold, a rising threshold, and/or a hysteresis as described in more details later on.

Advantageously, said burst mode restriction arrangement may be configured for establishing a DC component varying according to the result of an averaging of said first feedback parameter to be compared with a first threshold value.

The DC waveform may describe the average value of a waveform/curve detected at the first feedback parameter and indicating the amount of load at the output of the power supply arrangement within a predefined time span.

In an aspect, said first feed back parameter may be configured to be averaged for more than the time period of one duty cycle, preferably for more than the time period of 10 duty cycles such as more than the time period of 50 duty cycles of the operation of said switches.

The sensitivity of when to enter or leave the standby mode may thus advantageously be controlled. The longer time period over which the first feedback parameter is averaged, the less sensitive the burst mode operation arrangement will be to load variations.

Preferably, said burst mode restriction arrangement comprises a low-pass filter arrangement configured for establishing an average of said first feed back parameter.

Utilisation of a low-pass filter is a cost efficient way of obtaining an average of the first feedback parameter. However, it is understood that in other aspects any other suitable type of arrangement facilitating establishing an average may be achieved. One non limiting example of this may be the burst mode restriction arrangement comprising a digital circuit configured for sampling the first feedback over a time period, comparing the result with a threshold value and establishing a resulting parameter to control the restriction of the burst mode.

Preferably, at least the low-pass filter arrangement configured for establishing an average of said first feed back parameter is arranged external to the switch control arrangement.

In a preferred aspect, said first feedback parameter is a voltage indicative of the power supplying said potential load.

By monitoring a voltage indicative of the power supplying the potential load, a more simple way of monitoring the feedback may be achieved. In one aspect, the voltage is obtained by measuring the voltage over a resistance. It is however understood, that in other aspects, any other suitable way of obtaining a proper signal to be evaluated may be utilized.

Advantageously, said first feedback parameter may be arranged to be extracted between a lower switch of said switch arrangement and a resistor.

This has shown to be a simple and effective way of obtaining a reliable signal indicating the amount of power consumed at the output of the power supply device.

Advantageously, said burst mode restriction arrangement may be configured to disable said burst mode based on said evaluation by enabling said switch arrangement by utilizing an input of said switch control arrangement.

Thus, by enabling the switches, the power supply arrangement is prevented from unintentionally entering standby mode and thus unintentionally operating the power supply device in burst mode.

In a preferred aspect, said resonator tank comprises a LLC resonator arrangement.

An LLC has shown to be advantageous, but it is understood that any other suitable types of resonator arrangements may be utilized in other aspects.

In a preferred aspect, said burst mode operation arrangement may further comprise a voltage control arrangement configured for receiving and evaluating a second feedback parameter indicative of the output voltage of said power supply device and to enable said switch arrangement when said second feedback parameter exceeds a second threshold.

Thus, if the burst mode restriction arrangement has allowed the power supply device to enter standby mode, the voltage control arrangement assures that an appropriate voltage level is present at the output of the power supply at least during standby.

The voltage control arrangement preferably facilitates starting up the power supply device from standby, and enables the switch arrangement long enough so that the burst mode restriction arrangement can take over, in situations where a load consumes power at the output of an amount that should wake the power supply device up from standby mode. The burst mode restriction arrangement then prevents the power supply device from entering standby again until the next time the power supply device should be allowed to enter standby.

In a preferred aspect, said burst mode operation arrangement further comprises a standby power supply arrangement configured for automatically enabling and disabling said switch arrangement during standby so as to at least ensure power supply to said switch control arrangement in standby mode.

This may facilitate several advantages. One example is that a more advantageous control and/or less complicated implementation of the power supply to relevant circuitries of the power supply device during standby may be facilitated by implementing the standby power supply arrangement in the burst mode operation arrangement.

Also, thresholds of e.g. the voltage control arrangement and/or the burst mode restriction arrangement may be fine adjusted to a limit facilitating a lower power consumption in standby mode. The reason for this may e.g. be that the voltage control arrangement does not have to unnecessarily start up the switch arrangement to assure power supply to the circuitry of the power supply device during standby.

In general, in aspects wherein the burst mode operation arrangement both comprises a voltage control arrangement, a burst mode restriction arrangement and a standby power supply arrangement, the power consumption in standby mode may be fine adjusted thus e.g. facilitating a standby mode consuming less power.

The standby power supply arrangement is preferably based on knowledge of power consumption of circuitries of the power supply device in standby. Examples of such may be components having a non-ideal characteristic resulting in the components unintentionally consuming an amount power when not in operation, it may be circuitry/components needing to consume an amount of power to facilitate starting up the power supply from standby, and any other relevant circuitry/component.

In an advantageous aspect, said standby power supply arrangement may further be configured so as to provide power supply to said load in standby mode.

The load may still consume power in standby-mode to assure power supply to some basic functions such as e.g. a receiver circuitry facilitating receiving and processing e.g. wireless signals from a remote control, to assure power supply to lamps indicating standby, etc. Thus, in such scenarios, the standby power supply arrangement is preferably configured to supply sufficient power to such light loads during standby.

Advantageously, said standby power supply arrangement may comprise a timer arrangement configured for periodically enabling said switch arrangement.

This may be advantageous in that it is a simple and reliable way of providing enough power in standby mode.

In an aspect, said standby power supply arrangement comprises a pulse generator arranged to generate a pulse signal with a predetermined duty cycle to periodically enable said switch arrangement.

Preferably, said duty cycle of said pulse signal comprises an on-time between 0.1% and 15% such as between 1% and 10%, preferably between 3% and 7%.

In an aspect, said standby power supply arrangement may be configured for enabling and disabling said switch arrangement based on a feedback signal.

This may be advantageous in that the power supply arrangement only starts up the switch arrangement when power to e.g. charge energy storing components is needed. The feedback may be compared with a threshold as explained in relation to e.g. the voltage control arrangement of the burst mode operation arrangement described in this document. Thus, reduced power consumption in standby mode may be facilitated. The feedback may be arranged to be gathered from one or more locations in the power supply device, e.g. neat a capacitor, near a voltage supply to the switch control arrangement or the like.

In an advantageous aspect, said standby power supply arrangement may be configured for charging one or more energy storing electric components of said power supply device.

The powers supply device preferably comprises energy storing components such as capacitors that is charged during normal operation of the power supply device and which supplies power for an amount to the circuitry of the power supply device during standby for an amount of time. A non-limiting example may be the power supply device comprising a capacitor arranged near the output terminals to assure an appropriate output voltage at the output terminals of the power supply device when the device is in standby mode and the switches of the switch arrangement is not in operation. Another non-limiting example may be a capacitor arranged near a voltage supply to the switch control arrangement and being arranged to supply the switch control arrangement with sufficient power for an amount of time in standby mode. Also, such energy storing components may in aspects of the invention be configured for supplying power to a light standby-load connected to output terminals of the power supply device.

If the power supply device is in standby for an amount of time, it may be advantageous to charge the energy storing components to assure appropriate power supply in standby mode, and this may be assured by the standby power supply arrangement of the burst mode control arrangement.

In an aspect, said switch arrangement may be configured to be operated with a first duty cycle during normal operation and a second duty cycle in standby mode.

This may give some advantages in relation to e.g. saving power in standby mode.

In an advantageous aspect, a main power supply may be configured to supply said power supply device with power during normal operation and during standby.

This may facilitate several advantages, for example a more space saving power supply device may be achieved and a more cost efficient power supply device may be achieved.

Preferably, said main power supply at least comprises a transformer for transforming an external power supply to a voltage level appropriate for supplying circuitry of said power supply device with power.

For example, the external power supply may be a grid voltage such as 110V AC, 230V AC, 380V AC, it may be an external accumulator and/or the like.

By "a voltage level appropriate for supplying circuitry of said power supply device with power" is understood that the voltage supply from the main power supply supplies components of the power supply device with a voltage within the operational rage of the components/circuitry.

Preferably, said circuitry at least comprises said burst mode operation arrangement and said switch control arrangement.

In an aspect, said burst mode control arrangement is configured for generating a modulated output based on at least two burst mode control parameters.

This may be advantageous in that e.g. a more fine tuned control of the burst mode feature may be achieved.

Preferably, said control parameters is selected from a group of control parameters, said group of control parameters at least comprising an output from said burst mode restriction arrangement an output from said voltage control arrangement and an output from said standby power supply arrangement.

In an aspect, said burst mode operation arrangement may be arranged external to said switch control arrangement, and is configured to enable and disable the switch arrangement based on an output connected to an input terminal of said switch control arrangement.

This may be advantageous, e.g. in that the power supply device may more easily be adapted to the application in which it is intended to be used, e.g. by adapting thresholds, time period for averaging, duty cycle of pulse signals from the standby power supply arrangement and/or the like.

In another aspect, one or more arrangements of at least a part of the burst mode operation arrangement may be implemented in the switch control arrangement. One example may be that the voltage control arrangement and the standby power supply is integrated in the switch control arrangement, and a comparator part of the burst mode restriction arrangement is integrated in the switch control arrangement. In such an aspect, an output of an averaging arrangement of the burst mode restriction arrangement such as a low-pass may be connected to an appropriate input of the switch control arrangement. It is furthermore understood that in such an aspect, the switch control arrangement may be provided with proper input terminals for e.g. receiving the second feedback and an output from an averaging arrangement such as a low-pass filter.

In an aspect, said input terminal is further connected to an over current protection arrangement.

The over current protection arrangement preferably acts as a safety precaution if an overload in a circuitry of the power supply device is detected by the over current protection arrangement.

In a preferred aspect, at least one threshold configured to be utilized by said burst mode operation arrangement comprises a higher threshold and a lower threshold, said higher threshold and lower threshold establishing a resulting hysteresis.

This may be advantageous in relation to avoiding the burst mode operation arrangement unintentionally controlling of the switch arrangement to be turned on or off due to a varying feedback signal compared to only one threshold.

In general, in a preferred aspect, the burst mode control arrangement preferably interfaces by the first feedback and the second feedback with an input of the switch control arrangement. The input may at least control when the switch arrangement is enabled or disabled.

The present document furthermore relates to a second configuration of a power supply device, said power supply device comprising:
- a switch arrangement comprising switches for generating a square wave output,
- a switch control arrangement for controlling said switch arrangement,
- a resonator tank,
- a rectifier circuitry for rectifying an output from said resonator tank, wherein said switch arrangement is arranged to operate according to an output from said switch control arrangement, wherein said resonator tank is arranged to receive said square wave output, wherein said rectifier circuitry is arranged to provide an output to a potential load, and wherein said power supply device further comprises a burst mode operation arrangement configured to control a standby mode of said power supply device by generating a output based on:
- a first feedback parameter associated with a switch of said switch arrangement,
- a second feedback parameter associated with an output voltage of said power converter, and
- a standby power supply arrangement of said burst mode control arrangement.

Furthermore, the present document relates to a third configuration of a power supply device comprising:
- a switch arrangement comprising switches for generating a square wave output,
- a switch control arrangement for controlling said switch arrangement,
- a resonator tank,
- a rectifier circuitry for rectifying an output from said resonator tank, wherein said switch arrangement is arranged to operate according to an output from said switch control arrangement, wherein said resonator tank is arranged to receive said square wave output, wherein said rectifier circuitry is arranged to provide an output to a potential load, and wherein said power supply device further comprises a burst mode operation arrangement comprising a standby power supply arrangement configured for automatically enabling and disabling said switch arrangement during standby so as to ensure power supply to electric circuitry of said power supply device in standby mode.

Still further, the present document relates to a fourth configuration of a power supply device, said power supply device comprising:
- a switch arrangement comprising switches for generating a square wave output,
- a switch control arrangement for controlling said switch arrangement,
- a resonator tank,
- a rectifier circuitry for rectifying an output from said resonator tank, wherein said switch arrangement is arranged to operate according to an output from said switch control arrangement, wherein said resonator tank is arranged to receive said square wave output, wherein said rectifier circuitry is arranged to provide an output to a potential load, and wherein said power supply device further comprises a burst mode operation arrangement arranged to enable and disable said switch arrangement in standby mode based on at least:
- a first output generated based on an evaluation of a feedback parameter associated with the output voltage of said power supply device, and
- a second output from a standby power supply arrangement of said burst mode operation arrangement configured for automatically enabling and disabling said switch arrangement during standby.

Also, the present document relates to a fifth configuration of a power supply device, said power supply device comprising:
- a switch arrangement comprising switches for generating a square wave output,
- a switch control arrangement for controlling said switch arrangement,
- a resonator tank,
- a rectifier circuitry for rectifying an output from said resonator tank, wherein said switch arrangement is arranged to operate according to an output from said switch control arrangement, wherein said resonator tank is arranged to receive said square wave output, wherein said rectifier circuitry is arranged to provide an output to a potential load, and wherein said power supply device further comprises a burst mode operation arrangement arranged external to said switch control arrangement and facilitating controlling a standby feature of said power supply device by controlling an input terminal of said switch control arrangement based on a control signal modulated by control parameters resulting from an evaluation of at least one feedback parameter and a periodic pulse signal.

Likewise, the present document relates to a method of controlling a standby feature of a power supply device by a burst mode control arrangement, said method comprising:
- evaluating a first feedback parameter associated with a switch of said switch arrangement and being indicative of the power consumption at said output to said potential load, and establishing a resulting first output based thereon,
- evaluating a second feedback parameter associated with the output voltage of said power supply device and establishing a resulting second output based thereon,
- generating a third output by means of a standby power supply arrangement of said burst mode control arrangement, and
- establishing a resulting output based on said first output, said second output and said third output to control said standby feature of said power supply device.

Also, the present document relates to a second method of controlling a standby feature of a power supply device by a burst mode control arrangement, said method comprising:
- said burst mode operation arrangement receiving a first feedback parameter associated with a switch of said switch arrangement and being indicative of the power consumption at said output to said potential load,
- continuously averaging said first feedback parameter over a time period to establish a resulting parameter, and
- continuously comparing said resulting parameter with a first threshold, so as to disable said standby feature if said resulting parameter is exceeds said threshold.

Preferably, the standby feature is disabled if the resulting parameter exceeds the threshold in a first direction (e.g. is above the threshold), and is enabled if the if the resulting parameter exceeds the threshold in an opposite direction than the first direction (e.g. is below the threshold).

In general, it is understood that if the threshold comprises a hysteresis defined by a high threshold and a low threshold, the standby feature may be disabled if the resulting parameter is detected to be above the high threshold and is enabled if the resulting parameter is below the second threshold.

It is generally to be understood that one or more of the above described aspects and/or features thereof in aspects may be combined in a multitude of varieties with the above described first, second, third, fourth and/or fifth configuration of a power supply device, and/or one or more of the above mentioned methods of controlling a standby feature of a power supply device.

FIGURES

Aspects of the present disclosure will be described in the following with reference to the figures in which.

DETAILED DESCRIPTION

Figure 1:
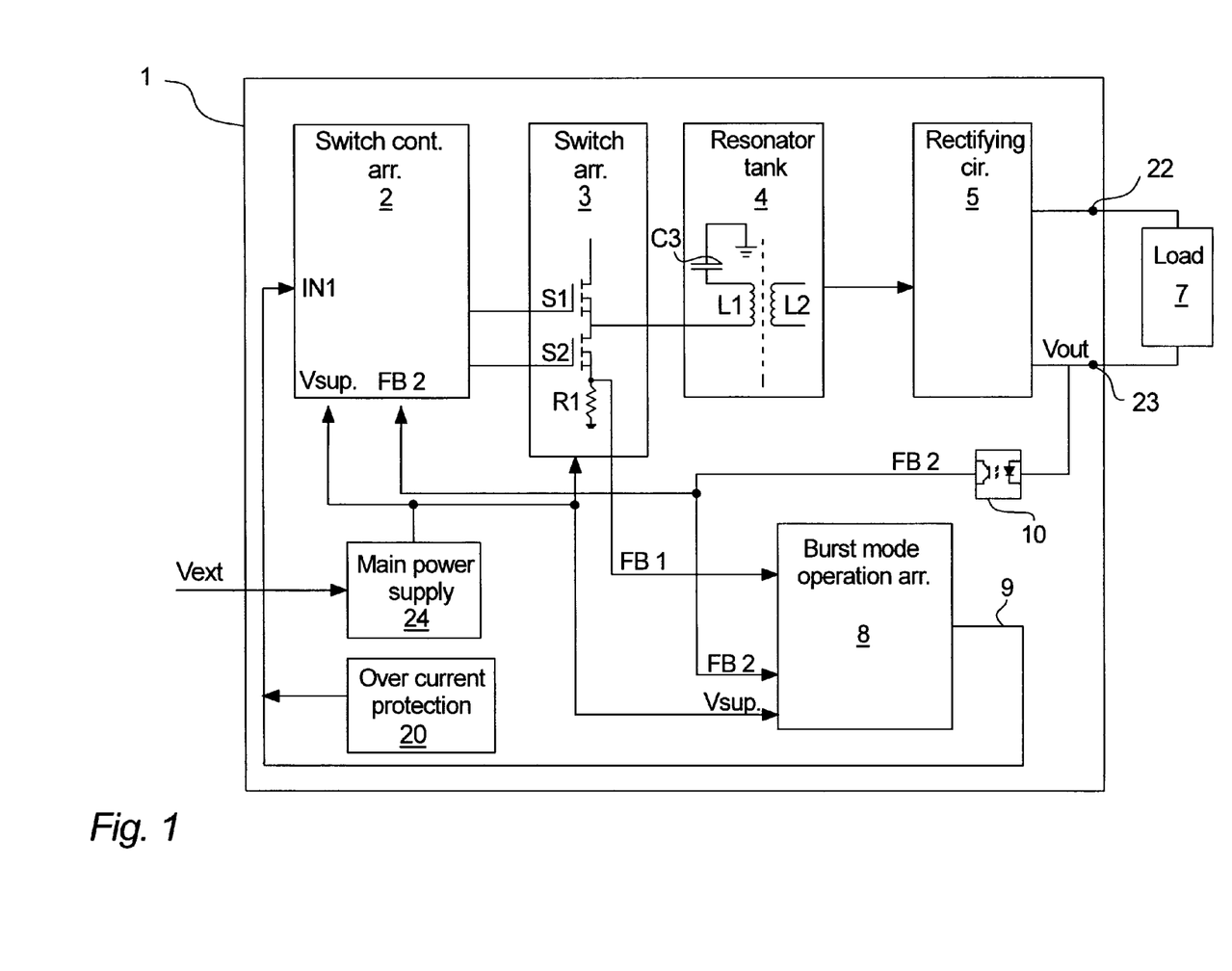
FIG. 1 illustrates a preferred aspect of a power supply device.

FIG. 1 illustrates an embodiment of a power supply device 1 according an advantageous aspect.

The power supply device 1 comprises a switch control arrangement 2. The switch control arrangement 2 is arranged to control a switch arrangement 3 comprises one or more switches, preferably at least comprising an upper switch S1 and a lower switch S2 for generating a square wave output based on the input from the switch control arrangement 2.

In a preferred aspect, the switch control arrangement 2 is an integrated circuit component, also called an IC component.

This square wave signal from t the switch arrangement 3 is forwarded to a resonator tank arrangement 4. The output signal of the resonator tank 4 is rectified by an appropriate rectifier circuitry 5 to be rectified to a DC power supply for a load 7 connected to output terminals 22, 23 of the power supply device 1.

The resonator tank arrangement 4 may comprise a LLC arrangement, a LCC arrangement, a LLCC arrangement or any other appropriate resonator arrangements. However, in preferred embodiments, the resonator tank arrangement 4 comprises a LLC arrangement in that such a resonator arrangement may be challenging to control in burst mode and the control of at least such a resonator arrangement may be enhanced by the present disclosure.

As illustrated in FIG. 1, the LLC arrangement may e.g. comprise a primary inductor L1 connected to the output of the switch arrangement 3 at one terminal and to ground through an appropriate capacitor C3 at the other terminal.

Furthermore, resonator tank arrangement 4 is preferably arranged to transfer energy to secondary windings L2 of an inductor for transforming the signal from the switch arrangement 3 to an appropriate output for the rectifier circuitry 5.

The switch control arrangement 2 is arranged to receive a feed back signal FB2 associated with the output voltage of the power supply device 1 to facilitate controlling the switches S1, S2 when a load 7 is connected to be supplied with power, and the power supply device 1 is thus configured to process the feedback FB2 to enable or disable the switches S1, S2 according to the feedback. The switches S1, S2 are preferably MOSFET type switches, but it is understood that any appropriate type of switches facilitating generating an appropriate square wave signal by proper operation of the switches may be relevant.

The feedback FB2 preferably comprises an opto-isolator 10 or another appropriate arrangement facilitating a similar feature.

The second feedback FB2 e.g. facilitates an enhanced stability of the output voltage, e.g. due to a variation of the load 7 and/or e.g. voltage variation of the power supply supplying the power supply device 1 with power.

FIG. 1 furthermore illustrates an advantageous embodiment, wherein the power supply device 1 comprises a main power supply arrangement 24 for supplying power Vsup to the various electric circuitry of the power supply device 1. The main power supply arrangement Vsup comprise appropriate control circuitry, a transformer for transforming an external power supply Vext such as a grid voltage to an appropriate voltage level to supply the various circuitry of the power supply device 1. The main power supply arrangement Vsup thus provides power to the switch arrangement 3, the switch control arrangement 2 and other appropriate parts of the power supply device 1. Furthermore, the main power supply arrangement Vsup preferably also supplies power to the burst mode control arrangement 8 in stand by mode, so that it is preferably the same main power supply arrangement Vsup that supplies the circuitry of the power supply device 1 in standby mode as well as in normal operation.

In a preferred embodiment it is the same power source that supplies the switch control arrangement 2 during stand by as it is when the power supply device is not in standby and operates in normal mode to supply a load 7 with power.

The power supply device 1 furthermore comprises a burst mode operation arrangement 8. This arrangement is arranged to take over the operation of the power supply device 1 during no-load or at a low load/light load at the output of the power supply device 1. The burst mode operation arrangement 8 is arranged to supply a burst mode control output 9 to the switch control arrangement 2 to facilitate enabling/disabling the switch control arrangement 2 to operate the switch control arrangement 2 in burst mode so as to facilitate standby with low power consumption.

As illustrated, the circuitry of the burst mode operation arrangement 8 may be arranged external/remote to the switch control arrangement 2, and operates the switch control arrangement 2 by means of an input terminal, in the present example called IN1. However, in other embodiments, at least a part of the burst mode operation arrangement 8 may be integrated in the switch control arrangement 1.

The burst mode operation arrangement 8 is preferably arranged to receive at least two feedback parameters FB1, FB2 for facilitating control of the burst mode during standby. The operation of the burst mode operation arrangement 8 is explained in more details in relation to FIG. 2 which illustrates a burst mode operation arrangement 8 according to preferred embodiments.

Figure 2:
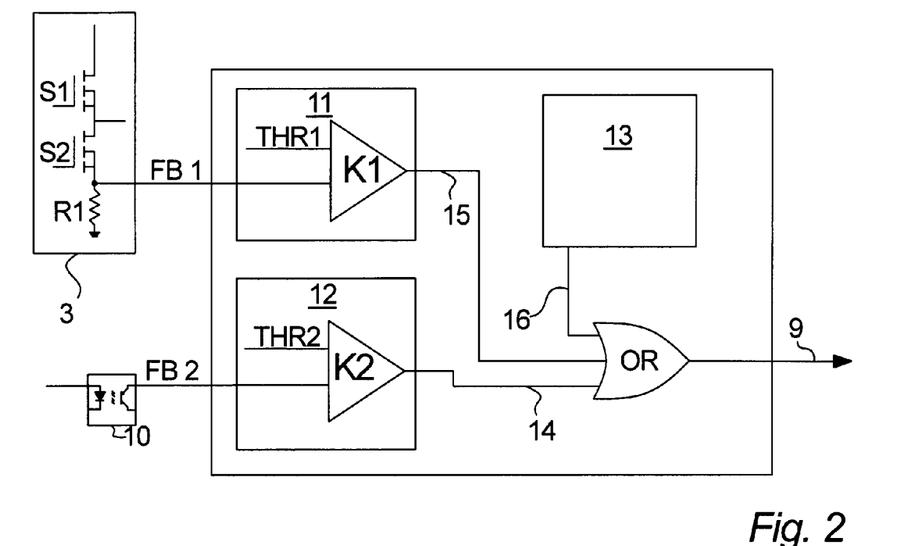
FIG. 2 illustrates an advantageous embodiment of a burst mode operation arrangement.

The burst mode operation arrangement 8 preferably comprises a voltage control arrangement 12. The voltage control arrangement 12 is configured for receiving an input comprising the above mentioned second feedback parameter FB2 which is associated with an output voltage of the power supply device 1. The feedback FB2 is used as an indication of the voltage level at the output of the power supply, and thus varies with a voltage level proportional to the output voltage.

The voltage control arrangement 12 is arranged to compare, e.g. by means of a comparator arrangement K2, if the voltage at the output gets below a threshold THR2. If the voltage associated with the output voltage gets below the threshold THR2, the voltage control arrangement 12 indicates a low state by means of the output 14. If the voltage associated with the output voltage gets above the threshold THR2, the voltage control arrangement 12 indicates a high state by means of the output 14.

The burst mode operation arrangement 8 furthermore comprises a burst mode restriction arrangement 11. The of the burst mode restriction arrangement 11 facilitates preventing the power supply device 1 from entering standby to be operated in burst mode when a load 7 is supplied with power from the power supply device 1 during normal operation.

Thus, the burst mode restriction arrangement 11 is arranged to continuously evaluate a first feedback parameter FB1 associated with a switch S2 of the switch arrangement 3. When a load 7 is connected to the power supply device 1, a current will flow through the switch S1, and this current may be used as an indicator of the order of the load 7. Thus by implementing a resistance R1 between the switch S1 and ground, the voltage over the resistance R1 may be used as an indicator of the order and/or status of the load 7 that is connected to the power supply. The second feedback FB2 is preferably arranged to be provided from a low side MOSFET source of the switch S2 which is grounded through the resistor R1.

As an example, when the load 7 increases, the current through the switch S2 increases and thus the voltage VR1 over the resistance R1 increases, thereby providing a parameter FB1 indicative of the load 7 connected to be supplied by the power supply device 1.

The burst mode restriction arrangement 11 is preferably arranged to compare the first feedback FB1 with a predefined threshold voltage THR1, e.g. by means of a comparator arrangement K1. The threshold THR1 may be selected to a value based on the application in which the power supply device is intended to be utilized, e.g. it may be determined based on at which output power level the power supply device 1 is wished to enter standby. One example may be that the power supply device 1 is configured to enter standby mode at a power consumption below about 5-10 W on the output terminals, and the threshold value THR1 and/or the resistance R1 is/are thus selected to a value reflecting the condition at the low side source of the switch S2 at this power consumption. Thus, comparator arrangement K1 may be designed to enable/allow the power supply device 1 to enter standby to be operated in burst mode when the current at the low side source of the switch S2 gets below the current identified to be present at this location at a power consumption about 5-10 W consumed by the load 7.

When the voltage VR1 over the resistance R1 gets below the threshold THR1, the burst mode restriction arrangement 11 by means of the output 15 controls if the power supply device 1 is allowed to be operated in burst mode by indicating a "high" state, whereas if the voltage VR1 is above the threshold THR1, the burst mode restriction arrangement 11 indicates by means of the connection 15 that the power supply is not allowed to enter into burst mode by indicating a "low" state.

In a preferred embodiment, the burst mode operation arrangement 8 furthermore comprises a standby power supply arrangement/component 13 for at least facilitating automatically turning the switch control arrangement 2 on and off during standby so as to ensure an appropriate level of power supply/self supply to the switch control arrangement 2 and other relevant circuitry of the power supply device 1 in standby. However, it may further be preferred that the component/arrangement 13 also facilitates controlling the switch control arrangement 2 so as to provide sufficient power to a potential light load connected to the output terminals of the power supply device 1 during standby. Such a light load may e.g. receiver circuitry for receiving signals from a remote control, it may be power supply to a data storage, it may be one or more LEDs for indicating to a person that the load 7 is in stand by mode, or the like.

In an advantageous embodiment, the 13 comprises a pulse generator comprising a timer arrangement for generating a pulse signal by periodically turning on and off the switch control arrangement 2. The timer arrangement may be arranged to operate with a predetermined duty cycle. An example may be generating a burst duty cycle with an on-time between 0.1 and 15% and a resulting off-time between 85% and 99.9% such as an on-time between 1% and 10% and a resulting off-time between 90% and 99%, and preferably with an on-time between 3% and 7% resulting off-time between 93% and 97%. One specific example may be an on-time at about 5% and thus a resulting off-time at about 95%.

The timer arrangement may comprise an appropriate integrated circuit (IC) component for facilitating the timer function, it may comprise a comparator arrangement for controlling the timer function, or any other appropriate timer facility.

The power supply device 1 in general may in embodiments of the invention comprise a plurality of energy storing components such as capacitors and inductors arranged appropriately in the power supply device 1 with the purpose of storing electric energy in standby mode to supply power to relevant parts of the power supply device 1. Such components may still uphold a certain amount of power in the system after being turned off in standby mode and this power may facilitate supplying e.g. the switch control arrangement 2 with sufficient power for a certain time period after putting the power supply device into standby mode, it may facilitate upholding a proper voltage level at the output terminals and/or the like.

An example may be that a capacitor is arranged at/near the voltage supply supplying the switch control arrangement 2 with power during normal mode. A further example may be that a capacitor is arranged at/near an inductor of the resonator tank 4 to uphold an appropriate voltage. An additional example may be that a capacitor is arranged at/near the output of the power supply device 7 to uphold the voltage at the output during standby mode.

In embodiments, the power supply arrangement/component 13 may facilitate charging such energy storing components.

In another embodiment, by appropriately monitoring one or more power supplies to the switch control arrangement 2 by means of one or more stand by power level feedbacks, the resonator tank arrangement 4 or the like it may be determined, e.g. by a comparator arrangement and an appropriate threshold (not illustrated in any drawings), when to turn on and off the switch control arrangement 2 during standby so as to ensure an appropriate level of power supply to the switch control arrangement 2 and/or other parts of the power supply device during standby.

The burst mode restriction arrangement 11, the voltage control arrangement 12 and the component 13 of the burst mode operation arrangement 8 together controls the burst mode by establishing a modulated control input 9 to the switch control arrangement. The control signal 9 from the burst mode control arrangement 8 is thus preferably modulated based on:
- a processing/evaluation of the first feedback FB1 by the burst mode restriction arrangement 11,
- a processing/evaluation of the second feedback FB2 by the voltage control arrangement, and
- a pulse signal or an output generated based on a feedback as exemplified earlier generated by the component/arrangement 13.

In general, it is understood that if just one of the arrangements 11, 12 or 13 indicates that the switch control arrangement 2 should enable the switches S1, S2 of the switch arrangement 3, the output 9 from the burst mode operation arrangement 8 is set to facilitate this properly.

In the present example, the input IN1 at the switch control arrangement 2, which is arranged to receive the output 9 from the burst mode operation arrangement 8 and turn on and off the switches S1, S2 accordingly, is configured so as that a "high" indication at the input IN1 (e.g. a voltage over predefined threshold) indicates that the switches S1, S2 should be enabled to be operated with a predetermined duty cycle controlled by the burst mode operation arrangement 8. When the input IN1 is set low by the output 9 from the burst mode operation arrangement 8, the switches S1, S2 are turned off.

It is in general understood that the burst mode operation arrangement 8 may comprise one or more inverting arrangements, e.g. comprising one or more transistors for adapting the output 14, 15, 16 from the arrangements 11, 12, 13 to fit the specific configuration of the switch control arrangement 2, e.g. so that a "low" state at the outputs from the arrangements 14, 15, 16 is converted to a "high" state and vice versa.

In general, the "low" and "high" level may be determined according to the configuration of the switch control arrangement 2. The input IN1 preferably comprises a bouncing preventing arrangement to avoid unintentional shifting between high and low level at the IN1 input. Such a bouncing preventing arrangement may comprise a timer function so that the input has to be at a specific level (low/high) for a predetermined time before toggling the input. Alternatively or additionally, the a bouncing preventing arrangement may comprise a threshold so that if a voltage detected to be below the threshold at the IN1 input is registered, the input is registered as "low", thus enabling the switches S1, S2, and if a voltage detected to be above the threshold at the IN1 input is registered, the input is set high, thus disabling the switches. The input voltage threshold may further be arranged to operate according to a hysteresis to avoid unintentional bouncing.

A non limiting example of a duty cycle controlled by the switch control arrangement 2 in standby when the input IN1 is set high by the output 9 may be approx. 50/50, but it is understood that any other duty cycle may be utilized during burst mode.

For example, in an embodiment, the switch control arrangement 2 may be adapted to operate the switches S1, S2 in normal mode with a duty cycle of approx. 50/50, and another duty cycle when operated in standby mode.

In the present example, the output 15 from the burst mode restriction arrangement 11 is set "low" to enable the switches S1, S2 due to the first feedback parameter FB1 being decided/registered to be above first threshold level THR1. Thus, the arrangement 11 prevents the power supply device 1 from entering standby by keeping the connection 15 "low".

Also, the output 14 from the voltage control arrangement 12 may be set "low" to enable the switches S1, S2. Thus, when the feedback parameter FB2 is detected to be below threshold level THR2, the arrangement 12 is arranged to enable the switches S1, S2 by keeping the connection 15 "low. When the feedback parameter FB2 is detected to be above threshold level THR2, the arrangement 12 is arranged to set the connection 15 "high".

Furthermore, the output 16 from the component 13 in the present example may be set low to enable the switches S1, S2. Thus, when the timer expires (or a monitored value gets below a certain threshold as explained above), the arrangement 13 is arranged to enable the switches S1, S2 by keeping the output 16 "low".

It is thus understood that the output 14, 15, 16 together with the operation of the arrangements 11, 12, 13 establishes an OR gate feature so that if just one of the output 14, 15, 16 are low, drive signals for the switches S1, S2 are turned on/enabled, otherwise if all the output 14, 15, 16 are high at the same time, drive signals for the switches S1, S2 are turned off to save power.

The outputs 14, 15, 16 from the arrangements 11, 12, 13 may thus be regarded as control parameters for controlling the output 9 of the burst mode control arrangement 8, and the outputs 14, 15, 16 establishes a resulting modulated burst mode control output 9 which is continuously modulated based on the status of the outputs 14, 15, 16 from the arrangements 11, 12, 13.

The resulting output from the outputs 14, 15, 16 of the arrangements 11, 12, 13 may in this embodiment inverted to establish the burst mode control signal 9, so that a "low" is transformed to a "high" signal and vice versa, but it is naturally dependent of the construction of the burst mode control arrangement 8 and the switch control arrangement 2 if the resulting output from the outputs 14, 15,16 should be inverted.

It is understood, that a "low" input at the IN1 input in other embodiments may be arranged to enable the switches, S1, S2, and that a "high" input at the IN1 input may be arranged to disable the switches S1, S2. In such an embodiment it is of cause understood that the output of the burst mode operation arrangement 8 and the optional voltage protection arrangement are adapted accordingly.

In a preferred embodiment, the input IN1 of the switch control arrangement 2 is further configured to be connected to an over current protection arrangement 20 configured for forcing the switch control arrangement 2 to turn off the switches S1, S2 if a current over a predetermined threshold is registered. In such an embodiment, the IN1 input may be connected both to the output 9 from the burst mode operation arrangement 8, and an output 21 from an over current protection arrangement 20. Preferably, the over current protection arrangement 20 is arranged to overrule the output 9 from the burst mode operation arrangement 8 as a safety precaution.

Figure 3:
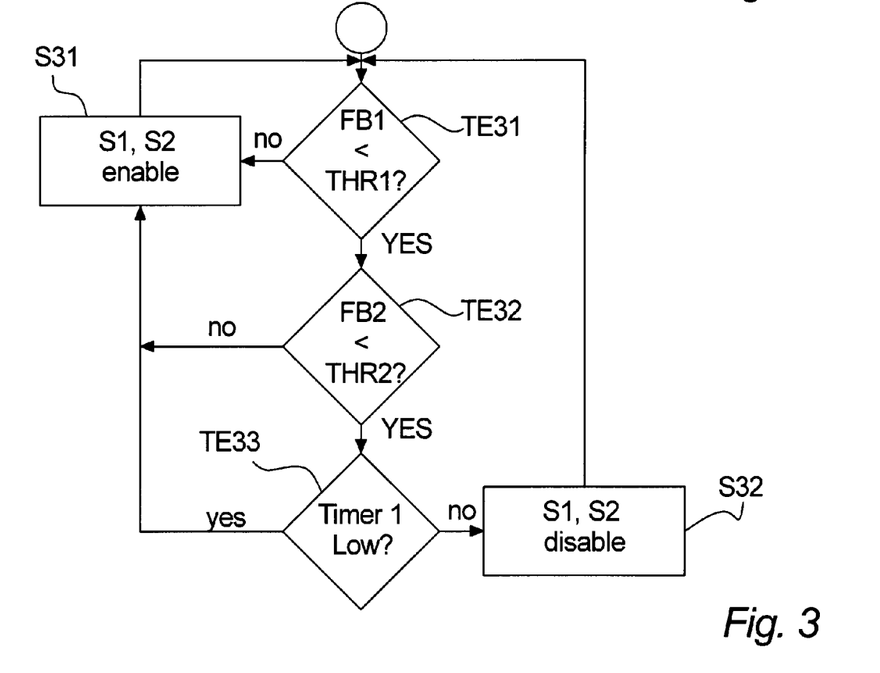
FIG. 3 illustrates a flow chart describing one advantageous embodiment of the operation of a burst mode operation arrangement.

FIG. 3 illustrates a flow chart of the operation of the burst mode operation arrangement 8 according to a preferred embodiment.

At test TE31, the burst mode restriction arrangement 11 tests if the feedback FB1 is below the first threshold THR1, to determine if a power consumption is present due to a load 7 at the output of the power supply device 1. If the feedback FB1 is not below the first threshold THR1, the burst mode restriction arrangement 11 enables the switches S1, S2 at step S31 by setting the output 15 low. Thus, the burst mode control output 9 is set to enable the switches S1, S2.

At test TE32, the voltage controller 12 of the burst mode operation arrangement 8 tests if the feedback FB2 is below the second threshold THR2 to determine if the output voltage of the power supply device 1 is below the threshold THR2. If the feedback FB2 is below the threshold second THR2, the voltage controller 12 enables the switches S1, S2 at step S31 by setting the output 14 low. Thus, the burst mode control output 9 is set to enable the switches S1, S2

At test TE33, the component 13 of the burst mode operation arrangement 8 tests if a timer Timer1 is low. If it is, the component 13 enables the switches S1, S2 at step S31 by setting the output 16 low. Thus, the burst mode control output 9 is set to enable the switches S1, S2

If conditions are fulfilled that the first feedback parameter FB1 is detected to be lower than the first threshold, if the second feedback parameter FB2 is detected to be higher than the first threshold, and the timer timer1 is high, the burst mode control output 9 is set high, and the switches S1, S2 are disabled.

Figure 4:
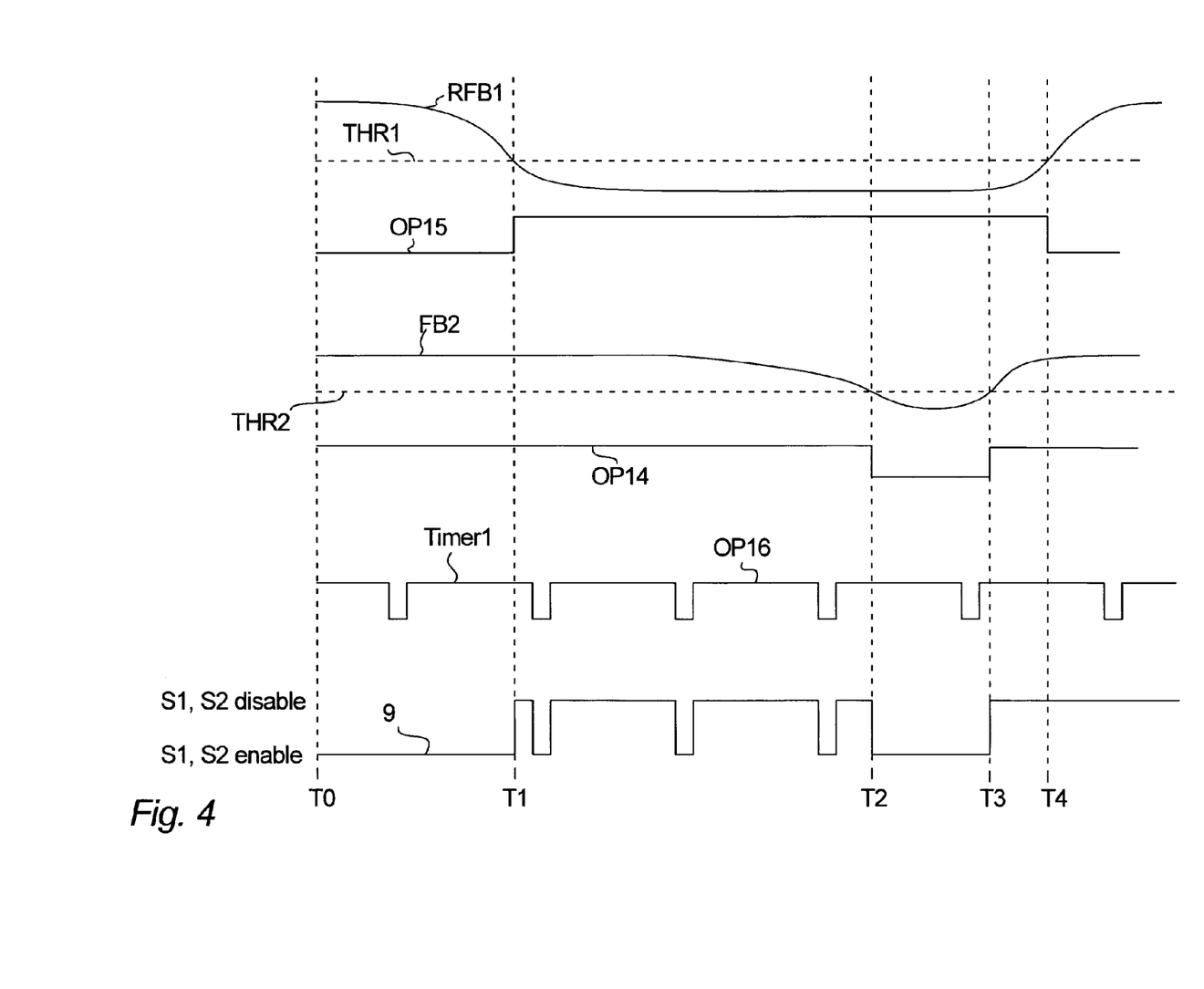
FIG. 4 illustrates an example of a series of events having influence on the operation of a the burst mode operation arrangement.

FIG. 4 illustrates a scenario according to an embodiment the operation of the burst mode operation arrangement 8.

At the time span between the time T0 and T1, the result of an evaluation of the feedback FB1, indicated by the curve RFB1 is detected to be above the threshold THR1. Thus, the status of the output 15 of the burst mode restriction arrangement 11, which is indicated by the curve OP15, is set low, and thus, the output from the burst mode output 9 is set low to enable the switches S1, S2 in normal operation. Thereby, the power supply device 1 is prevented from entering burst mode. In general, in FIG. 4, a "low" indication at the burst mode output 9 is configured for enabling the switches S1, S2, and a "high" indication at the burst mode output 9 is configured for disabling the switches S1, S2. This signal may of cause be inverted dependent of the configuration of the switch control arrangement 2.

Between the time T1 and T4, the result of the evaluation of the feedback FB1 is detected to be below the threshold THR1. Thus, the status of the output OP15 is set high resulting in the power supply device 1 entering standby to be operated in burst mode.

Between the time T1 and T4, where the power supply device 1 is in standby and is thus operated in burst mode, the stand by power supply arrangement 13 periodically enables the switches S1, S2 on and off with a predetermined duty cycle. The status of the timer is indicated by the curve OP16 indicating the output of the self supply arrangement. The result of the operation of component 13 is indicated at the resulting output 9 from the burst mode operation arrangement 8 between time T1 and D2, where it can be seen that status of the output 9 shifts according to status the output OP16 of the status of the component 13. Thus the switches S1, S2 are periodically enabled and disabled controlled by the stand by power supply arrangement 13.

Start of the standby mode to operate the power supply device 1 in burst mode may thus be controlled by the burst mode restriction arrangement 11 goverened by the first feed back parameter FB1.

End of the standby mode may additionally be controlled by the burst mode restriction arrangement 11, and may be identified when the result of e.g. an averaging RFB1 (explained in more details later on) of the first feedback signal FB1 crosses the first threshold.

The voltage control arrangement 12 governed by the second feedback parameter FB2 and preferably also the standby power supply 13 facilitates operating the power supply device 1 in burst mode during standby. When a load 7 resulting in that the power supply device 1 should end the standby mode is connected to output terminals of the device 1, the voltage control arrangement 12 continuously enables the switch arrangement 3 by the input IN1 until the burst mode restriction arrangement 11 takes over due to e.g. the result RFB1 of an averaging of the first feedback is above the first threshold THR1.

Now, in the time span between time T2 and T3, the voltage controller 12 of the burst mode operation arrangement detects that the feed back parameter FB2 gets below the second threshold THR2. Thus, the voltage at the output of the power supply device 1 is determined to be too low, and the status OP14 of the output voltage controller 12 thus shifts from high to low to enable the switches S1, S2 to get the voltage at the output to be at an appropriate level above the threshold THR2. Thus, the output 9 from the burst mode operation arrangement 8 is set low between T2 and T3 as indicated. At Time=T3, the voltage control arrangement detects that the feedback FB2 is above the threshold THR2, and thus shifts to a high status again, and the output 9 of the burst mode operation arrangement 8 is again set to periodically turn on and off in the time span between T3 and T4, controlled by the component 13.

At time=T4, the result of the evaluation of the feedback FB1 is detected to be below the threshold THR1 and thus, the status of the output OP15 of the burst mode restriction arrangement is set low, resulting in the power supply device 1 disabling the burst mode and turning into normal operation to supply a load 7 with electric power. Ahead of T=T4, the voltage control arrangement 12 of the burst mode operation arrangement 8 may have detected a voltage below the threshold THR2, e.g. due to a load 7 being connected to the output of the power supply device 1, and may thus enable the switches S1, S2 until the burst mode restriction arrangement 11 takes over. This is however not illustrated in FIG. 4 to ease understanding.

Figure 5:
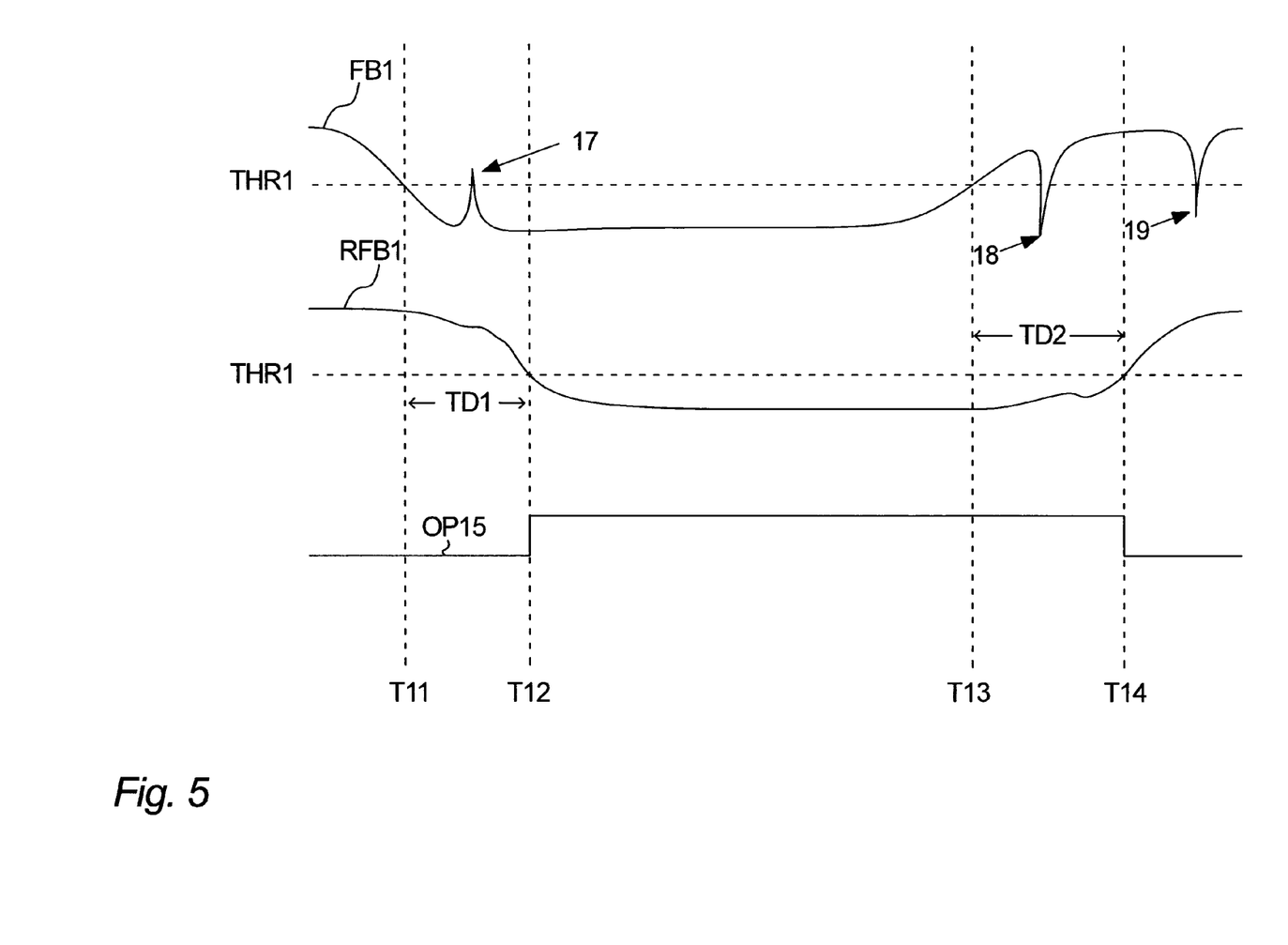
FIG. 5 illustrates an example of a time delay obtained by a burst mode operation arrangement.

FIG. 5 illustrates an operation of the burst mode restriction arrangement 11 according to a preferred embodiment. It is understood that the examples of the curves FB1, RFB1 and OP15 are purely examples to illustrate the concept of this embodiment.

The feedback FB1 associated with the current through the switch S2 is in this embodiment continuously averaged over a predefined time period, preferably by averaging the voltage over the resistor R1. This incorporates a time delay in the reaction of the burst mode restriction arrangement 11. For example, a time delay TD1 from the feedback FB1 exceeds the threshold THR1 at the time=T11 to the resulting evaluation RFB1 exceeds the threshold THR1 is incorporated at T12, thus setting the output from the burst mode restriction arrangement 15 low to enable burst mode.

Likewise, a time delay TD2 is incorporated between the time the first feedback FB1 cross the threshold at T=T13 to the resulting evaluation RFB1 exceeds the threshold THR1 at T14, thus ending/disabling the standby mode.

The result of the evaluation of the feedback FB1 which is indicated by the curve RFB1 may describe a DC component varying according to the result of the averaging of the first feedback parameter FB1, and is to be compared with the first threshold THR1. The DC component describes the mean/average value of the first feedback FB1 in the time period over which the feed back FB1 is averaged.

In an embodiment, the average is determined over a time period by utilizing a moving average approach.

The averaging of the feedback parameter FB1 over a time period e.g. facilitates that the burst mode restriction arrangement 11 is less sensitive to unintended load variations at the output such as e.g. sudden load spikes as indicated by references 17, 18 and 19 in the feedback curve FB1. Such load spikes may occur due to sudden and often unintended variations in the load 7 connected to the output of the power supply device. In FIG. 5, a first load spike 17 is indicated in the time span between time=T11 where the first feed back FB1 exceeds the threshold THR 1 and time=T12 where the resulting evaluation RFB1 exceeds the threshold at time=T12.

In the same way, a load spike 18 is indicated in the time span between time=T13 where the feedback parameter FB1 exceeds the threshold again, and time=T14 where the resulting evaluation RFB1 actually exceeds the threshold THR1. Also, a load spike 19 is illustrated after T=T14.

Due to the averaging of the feedback FB1 over time, the burst mode operation arrangement prevents the power supply device from entering standby or leaving of standby unintentionally due to short load variations in the form of e.g. load spikes.

It is in general understood that the inertia of the burst mode restriction arrangement 11 may be controlled to be at a proper level by designing the burst mode restriction arrangement 11 to average over an appropriate time period. The longer time period over which the first feedback parameter FB1 associated with the switch S2 of the switch arrangement 3 is averaged to achieve the result RFB1 of the averaging, the larger inertia of the burst mode restriction arrangement, and thus the burst mode operation arrangement is less sensitive to unintended load variations. On the other hand, the shorter time period over which the feedback parameter FB1 is averaged to achieve the result RFB1 of the averaging, the faster the burst mode restriction arrangement 11 enables/disables the standby mode to be controlled in burst mode.

In an embodiment, the time over which the feedback signal is averaged may be controlled based on the status of the burst mode. If the power supply device 1 is in normal operation and is thus not in burst mode, the burst mode restriction arrangement 11 may be set to average over a longer time period. Thus, the inertia of the power supply device in relation to entering burst mode is high, and the power supply device 1 is thus less sensitive to sudden unintended load variations. However, when the power supply device 1 is operated in burst mode, it may be wanted to facilitate a rapid start up time for the power supply device so that people operating a load 7 connected to the output of the power supply device does not experience a time delay. Thus the time period over which the first feedback parameter FB1 is averaged may be reduced compared to when not being in burst mode to achieve a faster start-up time from standby.

Figure 6:
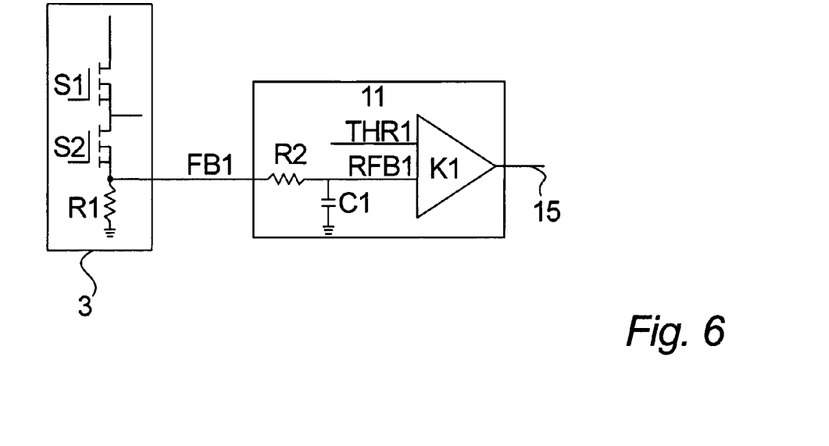
FIG. 6 illustrates an example of an advantageous way to obtain an average of a feedback signal.
Figure 7:
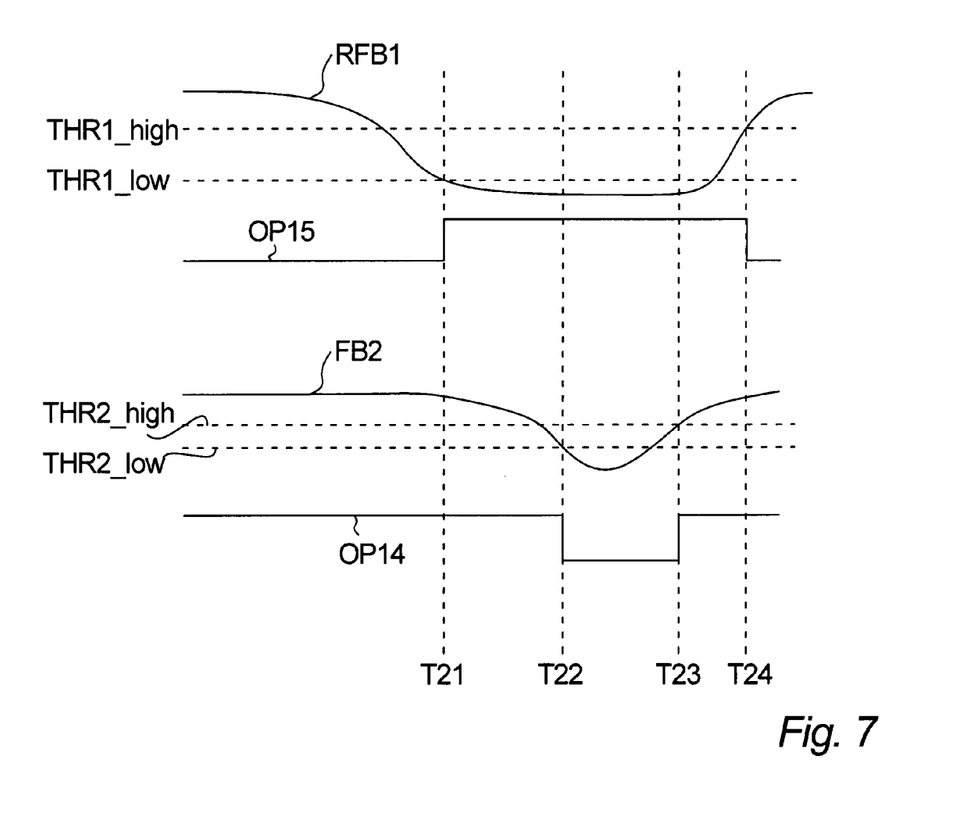
FIG. 7 illustrates an example of operating a burst mode operation arrangement according to a hysteresis.

FIG. 6 illustrates a preferred embodiment of determining an average of the first feedback parameter FB1 as described in relation to FIG. 5. In this embodiment, the burst mode restriction arrangement 11 comprises a low pass filter arrangement averaging the feedback FB1. The time period over which the first feedback FB1 is averaged is determined by a cut-off frequency of the low pass filter which is arranged at the input of the comparator arrangement K1 of the burst mode restriction arrangement 11. The low pass filter is in this embodiment illustrated by the resistor R2 and the capacitor C1 as illustrated in FIG. 7. The result of the averaging RFB1 may be compared to the first threshold THR1 as described in more details in relation to FIG. 5.

In an embodiment, the thresholds THR1 and/or threshold THR 2 is a resulting threshold established by a hysteresis defined by two thresholds. This embodiment is illustrated in more details in FIG. 7. As illustrated in FIG. 7, the result RFB1 of the averaging of the first feedback FB1 has to get below a low threshold THR1_low at time=T21 before the burst mode restriction arrangement 11 enables the system entering standby to be operated in burst mode. In a similar way, the result RFB1 of the averaging of the first feedback FB1 has to get above a high threshold THR1_high with a threshold value larger than the low threshold value THR1_low at time=T24 before the burst mode restriction arrangement 11 disables the system from entering into standby to be operated in burst mode.

A similar threshold feature comprising a hysteresis may be implemented for the voltage control arrangement 12 as illustrated by the THR2_low, THR2_high thresholds of FIG. 7. As illustrated, the second feedback FB2 in this embodiment has to get below a low threshold THR2_low at time=T22 before the voltage control arrangement 12 turns on the switch control arrangement 2. In a similar way, the second feedback FB2 has to get above a high threshold THR2_high at time=T23 with a threshold value larger than the low threshold value THR1_low before the voltage control arrangement 12 turns off the switch control arrangement.

In general, it is to be understood that the disclosure above is not limited to the particular examples described above but may be adapted in a multitude of varieties within the scope as specified in the claims. Furthermore, it is to be understood that two or more embodiments and/or features illustrated in the figures and/or described in the description of this document may also be combined in a multitude of varieties to achieve different embodiments not directly described in this document.

LIST

1: Power supply device
2: Switch control arrangement
3: Switch arrangement
4: Resonator tank arrangement
5: Rectifier circuitry
7: Load
8: Burst mode operation arrangement
9: Burst mode control output/signal
10: Opto-isolator
11: Burst mode restriction arrangement
12: Voltage control arrangement of burst mode operation arrangement
13: Standby power supply arrangement
14: Output of voltage controller.
15: Output of burst mode restriction arrangement
16: Output of self supply arrangement
17, 18, 19: Load spikes
20: Over current protection
21: Output from an over current protection arrangement.
22, 23: Output terminals of power supply device
24: Main power supply
S1: Upper switch of Switch arrangement
S2: Lower switch of Switch arrangement
FB1: First feedback parameter associated with a switch of the switch arrangement
FB2: Second feedback parameter associated with an output voltage of said power supply
RFB1: Result of evaluation of the first feedback parameter associated with a switch of the switch arrangement. Is preferably established by averaging the first feedback parameter over a predefined time period.
IN1: Input terminal of switch control arrangement, connected to output from switch control arrangement.
Vsup: Main supply for sullying power supply arrangement with power during normal mode and standby mode.

THR1_high,
THR2_high: High threshold of hysteresis
THR1_low,
THR2_low: low threshold of hysteresis

The invention claimed is:

1. A power supply device comprising:
   a switch arrangement comprising switches for generating a square wave output,
   a switch control arrangement for controlling said switch arrangement,
   a resonator tank,
   a rectifier circuitry for rectifying an output from said tank,
   wherein said switch arrangement is arranged to operate according to an output from said switch control arrangement, wherein said resonator tank is arranged to receive said square wave output, wherein said rectifier circuitry is arranged to provide an output, and
   wherein said power supply device further comprises a burst mode operation arrangement configured to facilitate a standby mode of said power supply,
   said burst mode operation arrangement comprising a burst mode restriction arrangement configured for receiving and evaluating a first feedback parameter associated with a switch of said switch arrangement and being indicative of the power consumption at said output said burst mode operation arrangement further being configures for receiving and evaluating a second feedback parameter indicative of the output voltage of said power supply device,
   the burst mode restriction arrangement being configured to disable and enable said burst mode feature based on said evaluation of both the first feedback parameter and second feedback parameter by controlling an output from said burst mode operation arrangement.

2. The power supply device according to claim 1, wherein said evaluation comprises continuously evaluating said first feedback parameter.

3. The power supply device according to claim 1, wherein said evaluation comprises said first feedback parameter being averaged over a time period.

4. The power supply device according to any of claim 1, wherein said evaluation comprises utilizing a moving average approach for continuously determining an average of said first feedback parameter within a predefined time period.

5. The power supply device according to claim 1, wherein said evaluation comprises comparing a result of an averaging with a first threshold and disabling said burst mode feature if said result cross said first threshold.

6. The power supply device according to claim 1, wherein said burst mode restriction arrangement is configured for establishing a DC component varying according to the result of an averaging of said first feedback parameter to be compared with a first threshold value.

7. The power supply device according to claim 1, wherein said first feedback parameter is configured to be averaged for more than the time period of one duty cycle of the operation of said switches.

8. The power supply device according to claim 1, wherein said burst mode restriction arrangement comprises a low-pass filter arrangement configured for establishing an average of said first feedback parameter.

9. The power supply device according to claim 1, wherein said first feedback parameter is a voltage indicative of the power supplying said output.

10. The power supply device according to claim 1, wherein said resonator tank comprises a LLC resonator arrangement.

11. The power supply device according to claim 1, wherein said burst mode operation arrangement further comprises a voltage control arrangement configured for receiving and evaluating said second feedback parameter indicative of the output voltage of said power supply device and to enable said switch arrangement when said second feedback parameter exceeds a second threshold.

12. The power supply device according to claim 1, wherein said burst mode operation arrangement further comprises a standby power supply arrangement configured for automatically enabling and disabling said switch arrangement during standby so as to at least ensure power supply to said switch control arrangement in standby mode.

13. The power supply device according to claim 12, wherein said standby power supply arrangement is further configured so as to provide power supply to said load in standby mode.

14. The power supply device according to claim 12, wherein said standby power supply arrangement comprises a timer arrangement configured for periodically enabling said switch arrangement.

15. The power supply device according to claim 12, wherein said standby power supply arrangement comprises a pulse generator arranged to generate a pulse signal with a predetermined duty cycle to periodically enable said switch arrangement.

16. The power supply device according to claim 15, wherein said duty cycle of said pulse signal comprises an on-time between 0.1% and 15%.

17. The power supply device according to claim 12, wherein said standby power supply arrangement is configured for enabling and disabling said switch arrangement based on said first and said second feedback signal.

18. The power supply according to claim 1, wherein said switch arrangement is configured to be operated with a first duty cycle during normal operation and a second duty cycle in standby mode.

19. The power supply device according to claim 1, wherein said burst mode control arrangement is configured for generating a modulated output based on at least two burst mode control parameters.

20. A method of controlling a standby feature of a power supply device by a burst mode control arrangement, said method comprising:
   a burst mode operation arrangement receiving a first feedback parameter associated with a switch of a switch arrangement and being indicative of the power consumption at said an output,
   continuously averaging said first feedback parameter over a time period to establish a resulting parameter, and
   continuously comparing said resulting parameter with a first threshold, so as to disable said standby feature if said resulting parameter exceeds said first threshold,
   receiving and evaluating a second feedback parameter indicative of the output voltage of said power supply device to enable said switch arrangement when said second feedback parameter exceeds a second threshold.

* * * * *